United States Patent
Elsener, Sr.

(10) Patent No.: US 6,324,712 B1
(45) Date of Patent: Dec. 4, 2001

(54) PLIER JAWS HAVING A WIRE CUTTING STRUCTURE

(75) Inventor: Carl S. Elsener, Sr., Ibach-Schwyz (CH)

(73) Assignee: Victorinox AG (CH)

( * ) Notice: Subject to any disclaimer, the term of this patent is extended or adjusted under 35 U.S.C. 154(b) by 0 days.

(21) Appl. No.: 09/571,336

(22) Filed: May 16, 2000

(51) Int. Cl.⁷ ....................................................... B25B 7/22
(52) U.S. Cl. .................................... 7/132; 7/129; 30/254
(58) Field of Search ........................... 30/254, 90.1, 112, 30/120; 81/9.4, 9.44; 7/128, 127, 125, 132

(56) References Cited

U.S. PATENT DOCUMENTS

| | | |
|---|---|---|
| 90,136 | 5/1869 | Truland . |
| 288,397 | 11/1883 | Barr . |
| 304,089 | 8/1884 | Entrekin . |
| 356,241 | 1/1887 | Dahl . |
| 422,670 | 3/1890 | Wallace . |
| 580,235 | 4/1897 | Strum . |
| 636,473 | 11/1899 | Thuillier . |
| 667,914 | 2/1901 | Klever, Jr. . |
| 753,048 | 2/1904 | Des Moineaux . |
| 836,075 | 11/1906 | Loudon . |
| 839,176 | 12/1906 | Morriss . |
| 858,003 | 6/1907 | Klever . |
| 871,476 | 11/1907 | Chaney . |
| 871,585 | 11/1907 | Haeberli . |
| 929,749 | 8/1909 | Bishop . |
| 998,920 | 7/1911 | Pasley . |
| 1,077,672 | 11/1913 | Vom Cleff . |
| 1,116,093 | 11/1914 | McKaig, Sr. . |
| 1,201,106 | 10/1916 | Shuter . |
| 1,293,966 | 2/1919 | Springer . |
| 1,305,513 | 6/1919 | Bernard . |
| 1,344,629 | 6/1920 | Fowler . |
| 1,357,637 | 11/1920 | Johnson . |
| 1,371,387 | 3/1921 | Metcalf . |

(List continued on next page.)

FOREIGN PATENT DOCUMENTS

WO 98/18599 5/1998 (WO) .

Primary Examiner—James G. Smith
(74) Attorney, Agent, or Firm—Pennie & Edmonds LLP

(57) ABSTRACT

A hand-operated wire cutting tool comprises a pair of jaw members interconnected and movable with respect to each other about a pivot axis between an open position and a closed position. A wire cutter portion is formed in each of the jaw members, each wire cutter portion having an inner surface and an outer surface, the inner and outer surfaces defining a cutting plane and the outer surface of each wire cutter portion intersecting the inner surface to form a sharp edge, the sharp edges passing closely alongside each other in the cutting plane as the jaw members move from the open to the closed position. A notch is formed in each of the sharp edges, each notch having a bottom surface angled less than 90° to the cutting plane. A recess is formed on the inner surface of at least one of the wire cutter portions adjacent the notch, the recess forming a gap between the inner surfaces of the wire cutter portions near the notches when the jaw members are in the closed position. Preferably, the gap between the inner surfaces of the wire cutter portions is greater than 0.1 mm. The wire cutter portion may also include a bump contiguous with each notch on each sharp edge, and projecting in a direction parallel to the cutting plane, wherein the bumps aid in guiding and retaining a wire between the notches during cutting. A multipurpose tool having a handle structure housing additional tool elements is also disclosed. The tool may comprise a first camming surface on a tang portion of each of the jaw members and a second camming surface on each of the handle members wherein the first camming surface abuts the second camming surface when the jaw members are in use to prevent unintended pivoting of the handle members with respect to the jaw members.

20 Claims, 7 Drawing Sheets

U.S. PATENT DOCUMENTS

| | | |
|---|---|---|
| 1,379,315 | 5/1921 | Shaner . |
| 1,388,398 | 8/1921 | Adams . |
| 1,396,863 | 11/1921 | Mayhew . |
| 1,508,687 | 9/1924 | Gilley . |
| 1,771,733 | 7/1930 | Ott . |
| 1,800,447 | 4/1931 | Froeschl . |
| 1,890,355 | 12/1932 | Bailey . |
| 1,924,837 | 8/1933 | Crause . |
| 2,249,515 | 7/1941 | Carroll . |
| 2,260,884 | 10/1941 | Clinton . |
| 2,264,840 | 12/1941 | Isaac . |
| 2,431,970 | 12/1947 | Swartz . |
| 2,590,031 | 3/1952 | Petersen . |
| 2,870,538 | 1/1959 | Townshend, Jr. . |
| 3,012,321 | 12/1961 | Townshend, Jr. . |
| 3,078,485 | 2/1963 | Carter . |
| 3,120,773 | 2/1964 | Esser . |
| 3,287,751 | 11/1966 | Hoffman . |
| 3,461,555 | 8/1969 | Bliznak . |
| 3,694,834 | 10/1972 | Daniels, Jr. . |
| 3,733,627 | 5/1973 | Epstein . |
| 3,871,078 | 3/1975 | Ogle . |
| 4,050,152 | 9/1977 | Olson . |
| 4,059,892 | 11/1977 | Siden . |
| 4,226,145 | 10/1980 | Gill . |
| 4,607,544 | 8/1986 | Jewell, Jr. . |
| 4,637,084 | 1/1987 | Wood . |
| 4,888,869 | 12/1989 | Leatherman . |
| 5,029,355 | 7/1991 | Thai . |
| 5,033,195 | 7/1991 | Appelkvist et al. . |
| 5,056,385 | 10/1991 | Petersen . |
| 5,142,721 | 9/1992 | Sessions et al. . |
| 5,267,366 | 12/1993 | Frazer . |
| 5,301,431 | 4/1994 | Cera . |
| 5,419,047 | 5/1995 | Farzin-Nia . |
| 5,485,641 | 1/1996 | Machmeier et al. . |
| 5,604,947 | 2/1997 | Bates et al. . |
| 5,638,602 | 6/1997 | Wilhelm . |
| 5,743,582 * | 4/1998 | Rivera ................................. 7/128 X |
| 5,745,997 * | 5/1998 | Berg et al. ........................... 7/128 X |
| 5,781,950 | 7/1998 | Swinden et al. . |
| 5,791,002 | 8/1998 | Gardiner et al. . |
| 5,826,338 | 10/1998 | Chilton et al. . |
| 5,978,993 * | 11/1999 | Rivera ................................. 7/128 |
| 6,009,582 | 1/2000 | Harrison et al. . |

* cited by examiner

PLIER JAWS HAVING A WIRE CUTTING STRUCTURE

FIELD OF THE INVENTION

The present invention relates generally to a wire cutter structure for a hand tool, and, more particularly, to a wire cutter structure formed on plier jaws of a compact multi-purpose tool.

BACKGROUND OF THE INVENTION

Compact multi-purpose hand tools contain pliers, screwdrivers, knife blades, saws, can and bottle openers, and other tool elements arranged and connected to a handle structure in such a way that the size of the tool is reduced when the tool is not in use. Examples of such tools are shown in U.S. Pat. Nos. 4,888,869 to Leatherman, 5,142,721 to Sessions et al., 5,267,366 to Frazer, and 6,009,582 to Harrison et al. The pliers in such tools, to provide added functions for the user, preferably include wire cutters, and for ease of manufacture, the wire cutters are preferably formed on a pair of plier jaws and have sharp edges that pass by each other in scissors fashion.

The wire cutters disclosed in the patents referenced above cleanly cut wires whose hardness is significantly less than the hardness of the wire cutters. However, when used to cut wires whose hardness approaches that of the sharp wire cutter edges, the edges may be deformed by the hard wire (e.g., burred). Such deformation of the wire cutter edges may cause the inner surfaces of the wire cutters to bind against each other and either lock the plier jaws in a closed position and/or prevent the plier jaws from opening and closing properly. This is especially alarming for compact, multipurpose tools for two reasons. First, since the plier jaws included with such tools are pivotally connected to and fold within channels formed in the handle structures, any additional force required to separate plier jaws binded by deformations may cause unintended folding and partial closure of the handles with respect to the jaws without necessarily opening the binded jaws. Second, if the plier jaws are successfully separated, a user may have difficulty returning the tool to its most compact configuration because the deformations will prevent the plier jaws from closing completely.

U.S. Pat. No. 5,826,338 to Chilton et al. discloses a multipurpose tool with plier jaws having wire cutter blades 50 with notches 60. Chilton seeks to alleviate the problems caused by deformations on the wire cutter blades 50 by disclosing notches 60 with bottom surfaces 63 that do not pass entirely by each other when the plier jaws are in the fully closed position. Thus, Chilton's notches are formed so that a clearance space 66 is left between opposed bottom surfaces 63 of notches 60 when the plier jaws are completely closed (see FIGS. 9 and 10 of the Chilton patent). Thus, even if small burrs are formed on or adjacent the bottom surfaces of the notches, the notches do not need to clear each other and the burrs, therefore, do not adversely impact opening or closing of the plier jaws.

As mentioned above, however, Chilton's notches do not completely pass one another when the plier jaws are fully closed. Thus, the Chilton device will not properly cut some small diameter wires because the bottom surfaces of the notches will not make sufficient contact with these wires.

If no clearance space is left between the bottom surfaces of the notches, then the flat bottom surfaces are nonetheless desirable because they are less likely to be deformed by hard wires than are sharp cutting edges. However, such flat bottom surfaces still deform upon cutting hard wire, and cause binding of the plier jaws if no clearance is left between those surfaces.

It is therefore desirable to provide a notched wire cutting structure capable of cutting wires of all sizes, while minimizing or negating the effects of deformations caused by hard-wire cutting.

SUMMARY OF THE INVENTION

In a preferred embodiment, the present invention relates to a hand-operated wire cutting tool comprising a pair of jaw members interconnected and movable with respect to each other about a pivot axis, between an open position and a closed position; a wire cutter portion formed in each of the jaw members, each wire cutter portion having an inner surface and an outer surface, the inner surface defining a cutting plane and the outer surface intersecting the inner surface to form a sharp edge, the sharp edges passing closely alongside each other in the cutting plane as the jaw members move from the open to the closed position; and a recess formed on a portion of the inner surface of at least one of the wire cutter portions, the recess forming a gap between the inner surfaces of the wire cutter portions when the jaw members are in the closed position such that any deformation of the sharp edges is accommodated in the gap and the jaw members freely open and close despite such deformation. The gap between the inner surfaces of the wire cutter portions is preferably large enough to accommodate typical deformations caused from cutting hard wire, such as 0.2 mm.

The jaw members may further comprise a notch formed in each of the sharp edges, each notch having a bottom surface angled less than 90 degrees to the cutting plane. The recess may be formed adjacent or contiguous with the notch. The jaw members may also comprise a bump contiguous with each notch on each sharp edge, and projecting in a direction parallel to the cutting plane, wherein the bumps aid in guiding and retaining a wire in the region of the notches.

In one application, the invention is incorporated in a compound, multiple function, foldable tool having first and second handles, a tool head with pivotal jaw members (i.e., plier jaws), and a plurality of additional tools. The jaw members are stored within channels on the handles so that the tool folds completely into a compact unit. The tool may further comprise a first camming surface formed on a tang portion of each of the jaw members and a second camming surface on each of the handle members wherein the first camming surface abuts the second camming surface when the jaw members are in use to prevent unintended pivoting of the handle members with respect to the jaw members.

BRIEF DESCRIPTION OF THE DRAWINGS

The present invention will be understood and appreciated more fully from the following detailed description, taken in conjunction with the drawings in which.

DETAILED DESCRIPTION OF THE PREFERRED EMBODIMENTS

While the subsequent description of the present invention makes particular reference to a compact (i.e., folding) multipurpose hand tool, it should be understood that application of the present invention is not limited to tools of that particular configuration. Moreover, the present invention is intended to encompass all types of multipurpose tools, wire cutting pliers, wire cutters, and metal shears.

Figure 1:
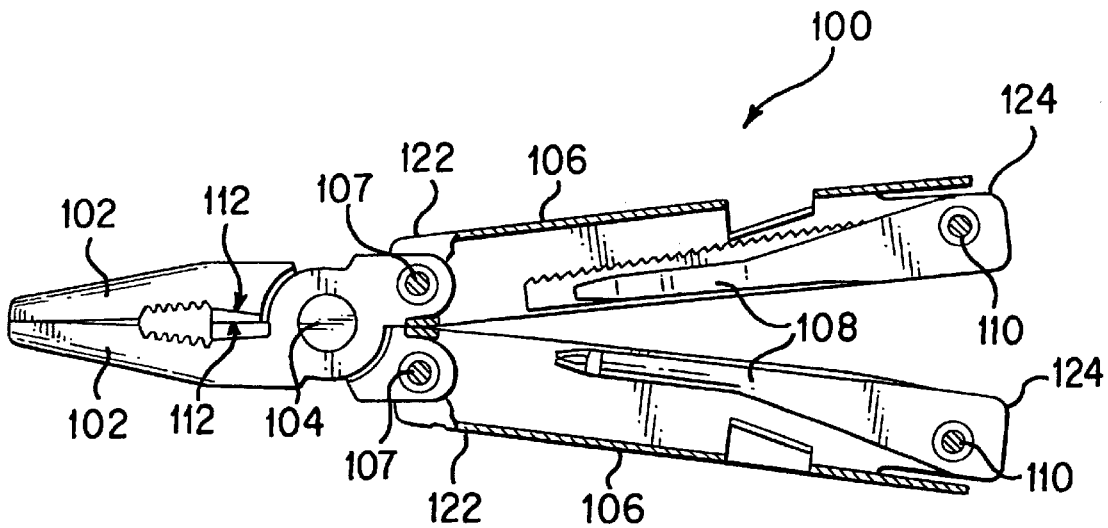
FIG. 1 is a side elevational view of a prior art folding multipurpose tool in an open position including plier jaws incorporating wire cutter blade portions.
Figure 2:
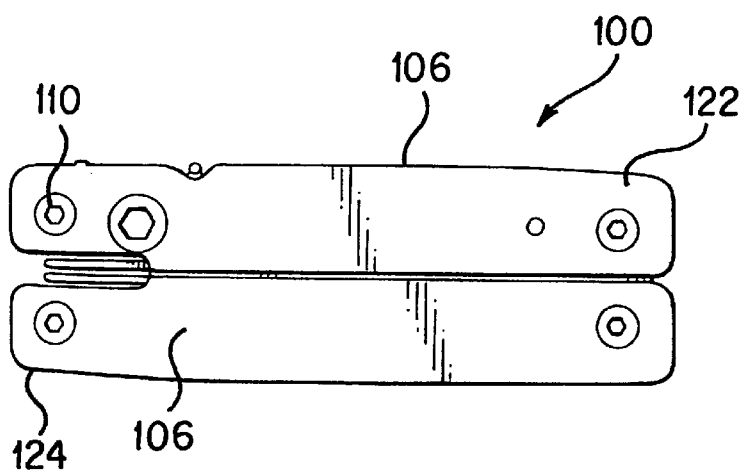
FIG. 2 is a side elevational view of the prior art folding multipurpose tool of FIG. 1 in its closed position.
Figure 3:
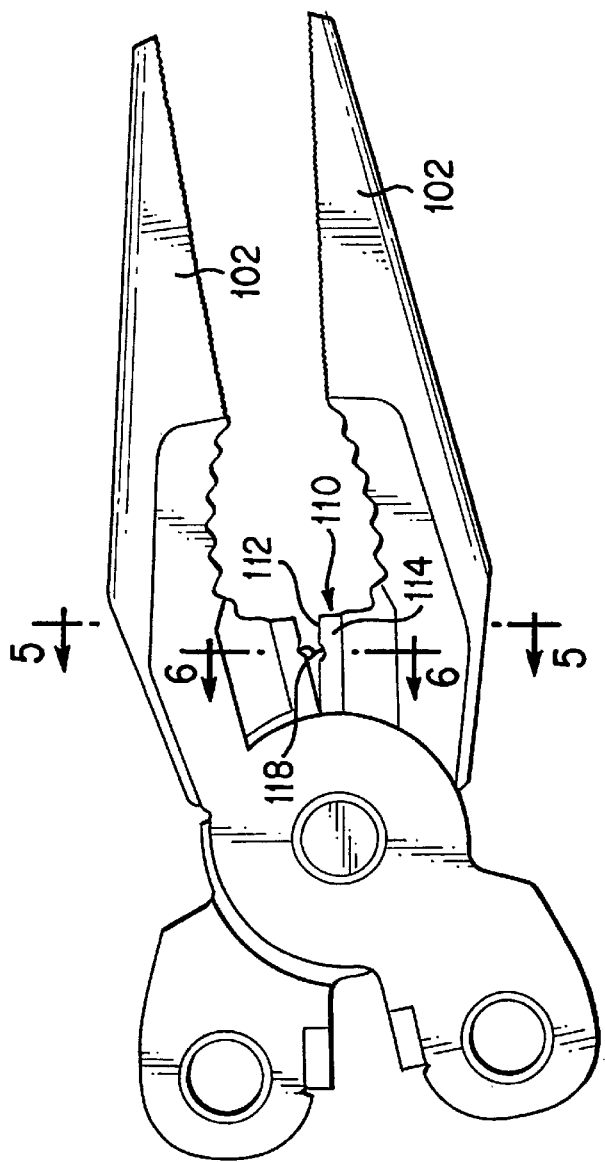
FIG. 3 is a side elevational view of a pair of jaw members of a prior art multipurpose tool showing an indentation/deformation caused by cutting hard wire.
Figure 4:
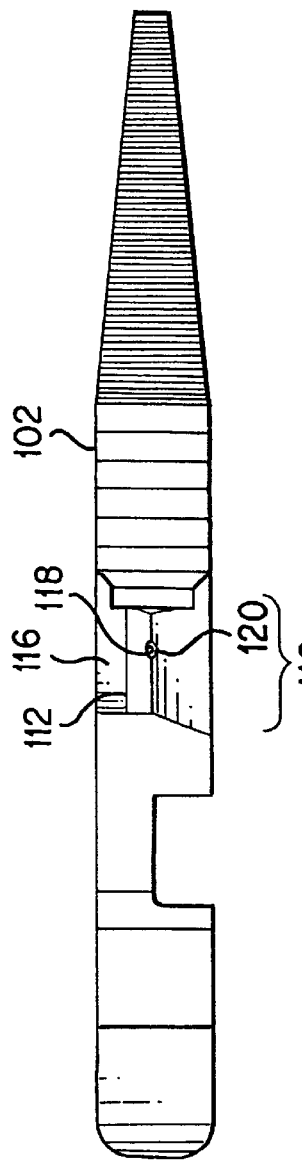
FIG. 4 is a top view of one of the prior art jaw members shown in FIG. 3.
Figure 5:
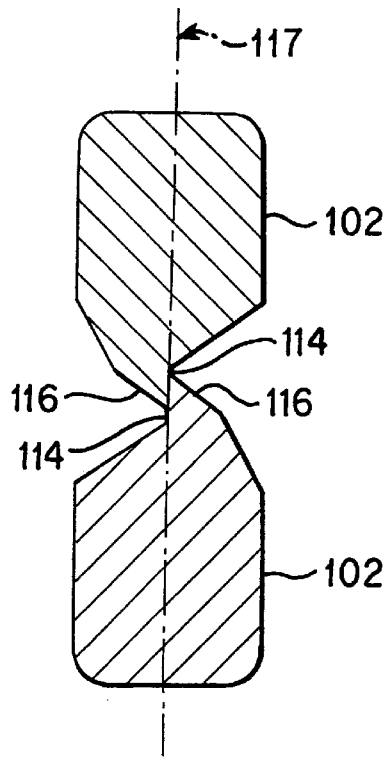
FIG. 5 is a cross-sectional view of the jaw members of FIG. 3 taken along line 5—5.

FIGS. 1 and 2 show a prior art compact multipurpose tool 100 in its open and closed positions, respectively. Tool 100 includes a pair of jaw members 102, such as plier jaws, pivotally connected to each other by a conventional jaw pivot defining a pivot axis 104. Each jaw member 102 is connected to, and pivots respect to, an associated handle member 106 at a first end 122 of handle members 106 by means of a pivot pin 107. Each handle member 106 of tool 100 may be configured to house several tool elements 108 which pivot independently of one another about a respective pin 110 located at a second end 124 of each of handle members 106. Tool elements 108 are located in respective storage positions within profiled handle members 106. When completely closed, tool 100 (as shown in FIG. 2) is relatively small and may be carried comfortably in the pocket of one's clothing. When jaw members 102 are extended with respect to handle members 106, the multipurpose tool 100 is conveniently useful as a pair of pliers (or other type of tool, depending on the configuration of jaw members 102) including wire cutting portions 112.

Figure 6:
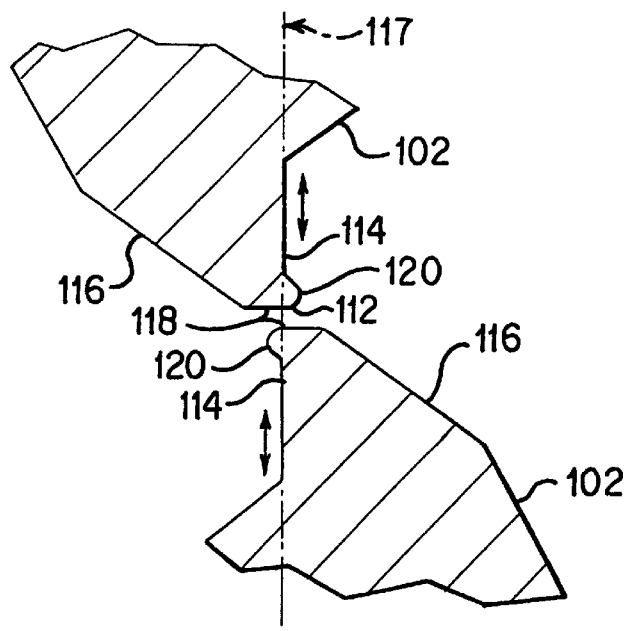
FIG. 6 is a cross-sectional view of the jaw members of FIG. 3 taken along line 6—6, showing the effect of deformations caused by cutting hard wire.

As shown in FIGS. 3, 4, 5 and 6, prior art compact multipurpose tools include jaw members 102 with wire cutter portions 110. Each wire cutter portion 110 has a sharp edge 112 defined along the intersection of a preferably substantially flat inner face 114 with a preferably substantially flat outer face 116. The inner faces 114 on a pair of interconnected jaws are substantially coplanar, so that pivoting of jaw members 102 to and away from each other results in scissors-like interaction of wire cutter portions 110, with their sharp edges 112 sliding past each other in an overlapping relationship and defining a cutting plane 117 (shown in FIG. 5). Each sharp edge 112 is forced into the surface of a wire being cut, and acts as a knife at the same time wire cutter portions 110 are also placing opposing shearing forces on the wire being cut. When cutting wires whose hardness approaches that of sharp edge 112, not only is the wire deformed and ultimately cut, but the metal of wire cutter portion 110 is likely to be deformed as well, as shown at 118. The deformed portion 118 results in reduced sharpness of edge 112 at that location, decreasing the effectiveness of wire cutter portions 110. Moreover, some of the deformed material is typically displaced laterally in the direction of inner face 114 of the other wire cutter portion 110, extending into cutting plane 117, as shown in FIG. 6. The laterally displaced material 120 associated with each sharp edge 112 thereafter rubs against inner face 114 of the opposing wire cutter portion 110, increasing the amount of friction which must be overcome in moving the jaws relative to each other in either direction, and thereby hampering or preventing complete closure of tool 100. This problem is especially troubling for users of compact multipurpose tools, because the jaw members in such tools must completely close in order for the tool to fold as a compact unit. Thus, if the jaw members do not open and close properly, one of the main objectives of such tools, compactness, is thoroughly frustrated. In addition, because the jaw members 102 pivot with respect to handle members 106 by means of pivot pins 107 during folding and unfolding of the tool 100, the handles may have a tendency to fold unexpectedly if a user applies excessive force in an attempt to separate jammed jaw members 102. Thus, once deformed jaw members 102 are closed, reopening may be nearly impossible because of the foldable configuration of tool 100 which does not completely transmit forces applied to handle members 106 to jaw members 102.

Figure 7:
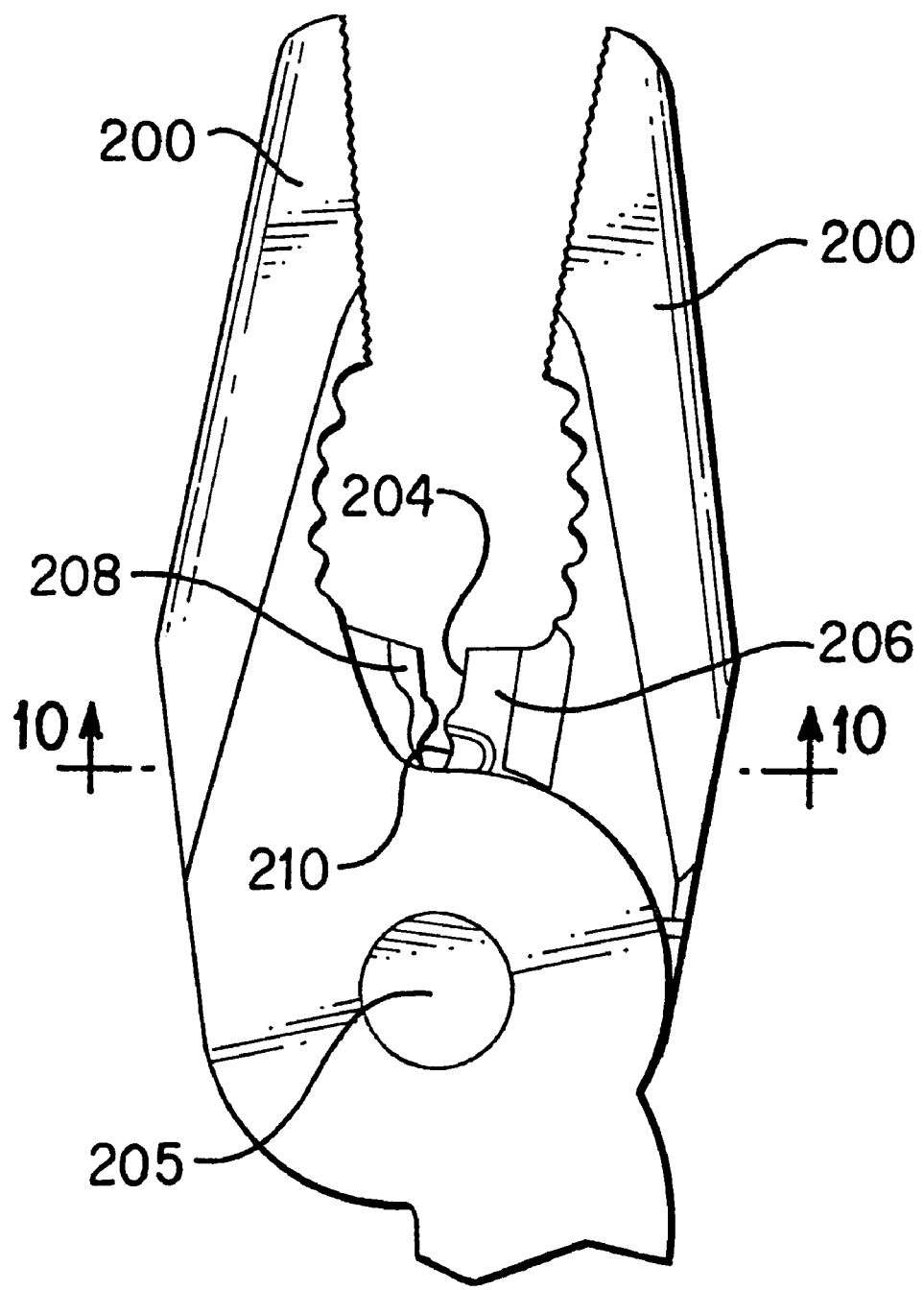
FIG. 7 is a side elevational view of jaw members having a wire cutting structure formed in accordance with the present invention.
Figure 9:
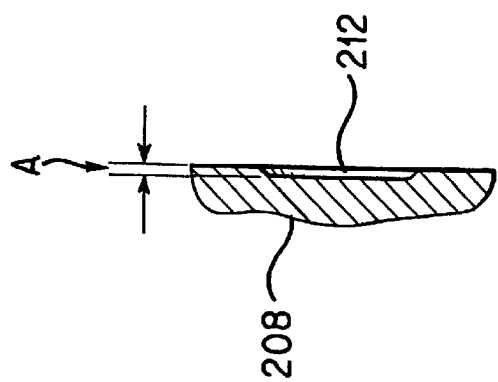
FIG. 9 is a cross-sectional view taken along line 9—9 of the jaw member shown in FIG. 8.
Figure 8:
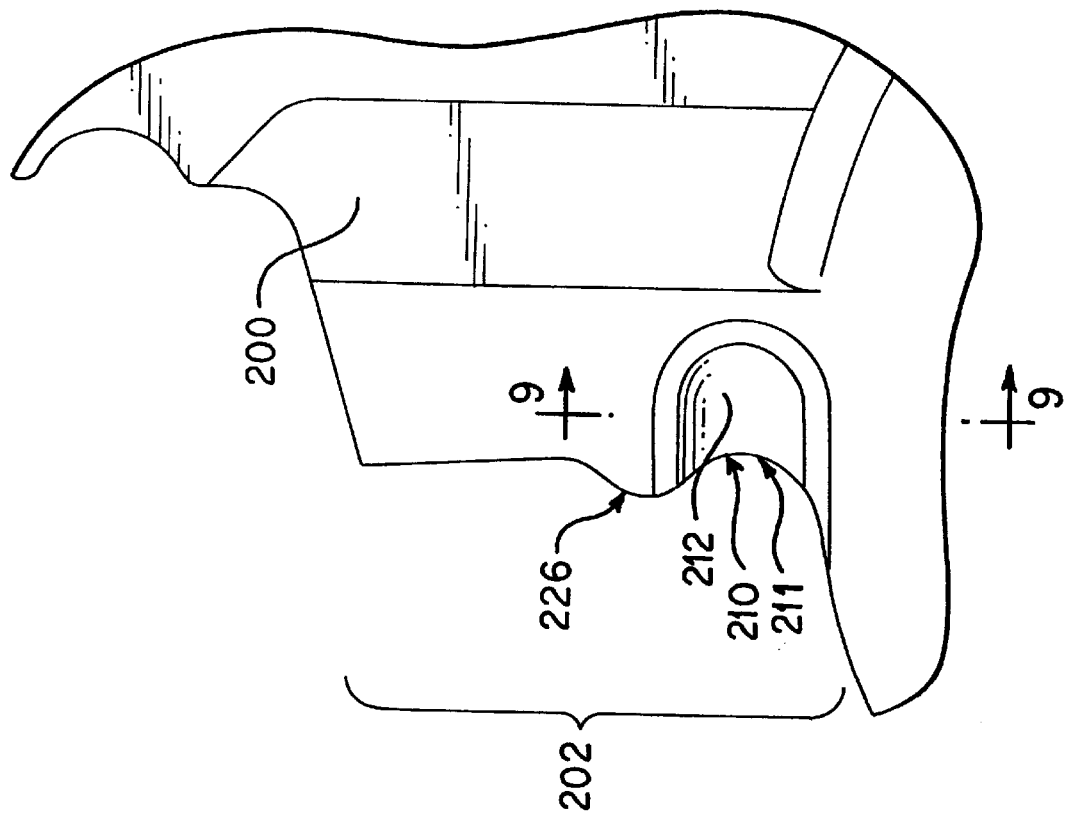
FIG. 8 is an enlarged view of the wire cutting structure shown in FIG. 7.

FIGS. 7, 8, 9 and 10 show a jaw member 200 with a wire cutting portion 202 formed in accordance with the present invention. With particular reference to FIGS. 7, 8, and 9, jaw members 200 pivotally interconnect about a pivot axis 205, and are configured for attachment to a pair of handles (not shown) such as in the prior art tool shown in FIG. 1. Wire cutting portion 202 includes a sharp edge 204, formed by the intersection of an inner surface 206 and an outer surface 208. The inner surfaces 206 of jaw members 200 are substantially parallel to each other. In operation, the sharp edges 204, and their respective inner surfaces 206, pass closely alongside each other in scissors-like fashion to form a cutting plane 220. A notch 210 is formed on sharp edge 204 near pivot axis 205, intersecting portions of both inner and outer surfaces 206, 208. As shown, notch 210 is lunular (i.e., crescent-shaped), but may be semi-circular, semi-ellipsoidal, v-shaped, or any other suitable shape.

Figure 10:
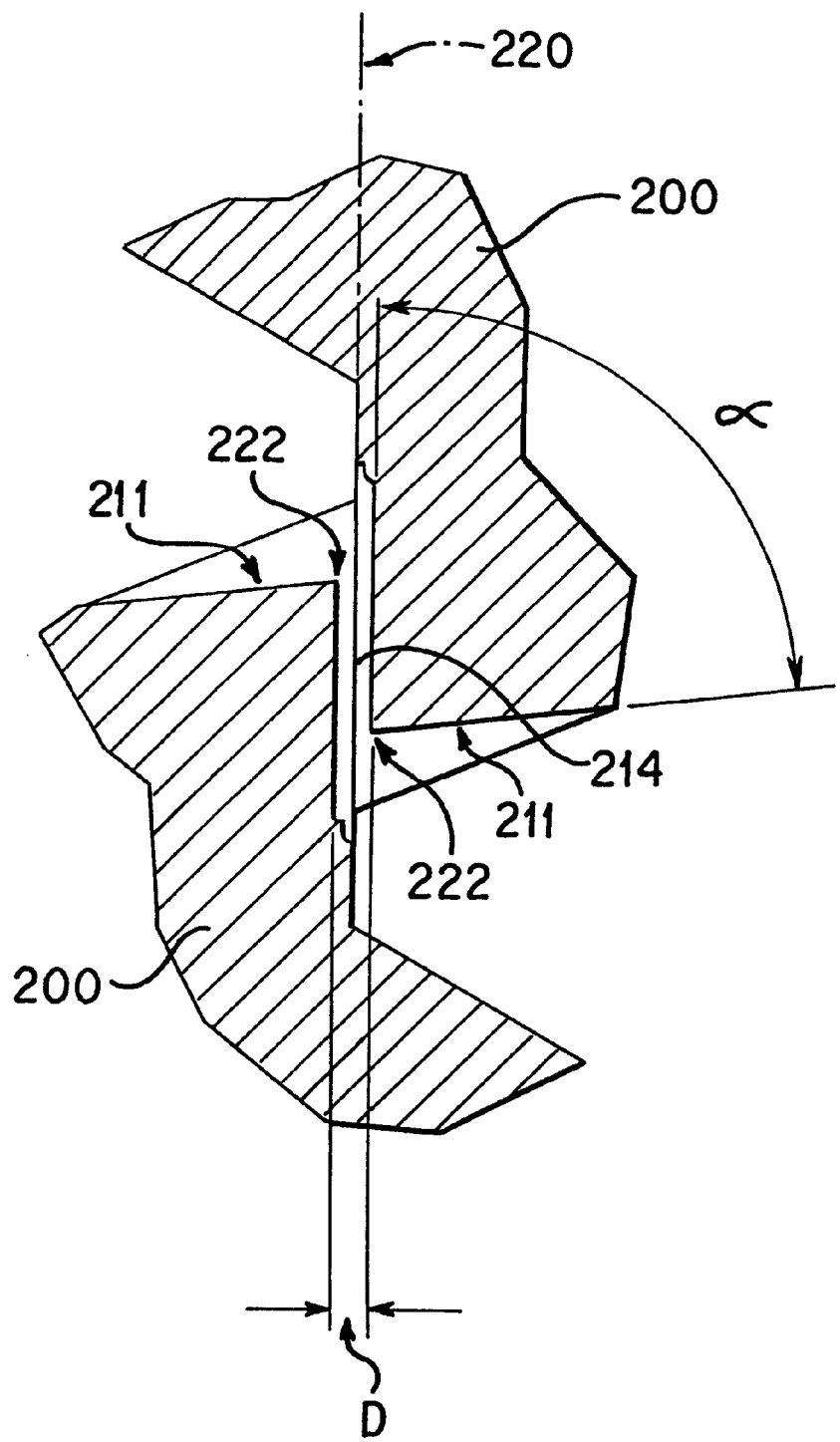
FIG. 10 is a cross-sectional view of the jaw members of FIG. 7 taken along line 10—10.

As shown best in FIG. 10, bottom surface 211 of notch 210 forms an angle α relative to cutting plane 220, where angle α is less than 90° to cutting plane 220. Bottom surface 211 of notch 210 provides support against the surface of a wire over a significant area, so that bottom surfaces 211 of two notches 210 act on opposite sides of a wire to shear it apart along the cutting plane. Moreover, because bottom surface 211 of notch 210 is acutely angled relative to cutting plane 220, cutting edge 222 formed by angle α facilitates cutting into a wire, when compared to the pure shearing action of a notch with a bottom surface perpendicular to the cutting plane. In a preferred embodiment, angle α is approximately 83° to the cutting plane. In alternate embodiments, angle α may range from approximately 83° to approximately 89°. In still other embodiments, angle α may range from approximately 70° to approximately 89°. It should be understood, however, that if the angle α is significantly less than 90°, such as 60°, the cutting edge 222 formed will be too sharp and, therefore, too easily damaged by cutting hard wire.

In accordance with the principles of the present invention, recess 212 is formed on the inner surface 206 of wire cutting portion 202 adjacent notch 210. When jaw members 200 are in a closed position, recesses 212 on a pair of jaw members 200 form a gap 214 (see FIG. 10) between inner surfaces 206 of cutting portions 202. Any deformations (e.g., burrs) on notches 210 caused by the cutting of hard wires will project into gap 214 between inner surfaces 206, rather than rub or scrape against an adjacent inner surface. Thus, the operation (e.g., opening and closing) of the jaw members will not be compromised by burrs caused by hard-wire cutting because there will be no increased frictional forces due to rubbing or scraping of the burrs between inner surfaces 206, as in the prior art. Further, since any burrs that develop will not bind or lock the jaw members in a closed position, the user need not apply additional force to the handles in an effort to separate binded jaws.

As shown, recess 212 is partially obround in plan (i.e., half of a race track), but it should be understood that recess 212 may be formed in many other shapes. As shown in FIG. 9, each recess is depressed a distance "A" from the surrounding inner surface 206. In a preferred embodiment, distance "A" is approximately 0.1 mm, so that both recesses together form a total gap of approximately 0.2 mm between inner surfaces 206. This total gap is best shown in FIG. 10 as distance "D." It should also be noted that angled cutting edge 222 in notch 210, discussed above, also facilitates wire cutting where there is a recess or gap between opposed cutting surfaces. In particular, the provision of a blunt cutting surface at recess 212 may result in incomplete shearing of a wire since the portion of the wire adjacent a recess is merely sheared, rather than cut by an angled cutting edge 222 and the gap between inner surfaces 206 may leave an uncut portion of wire therebetween. Notch 210 may be hardened relative to the surrounding metal material by anodizing, so that the occurrence of burring is further reduced.

A bump, or bulge, 226 is formed adjacent and contiguous with notch 210 projecting in a direction parallel to cutting plane 220 and positioned further from pivot axis 205 than notch 210. Bump 226 aids in guiding a wire to and retaining a wire in the region of notch 210 during cutting. Bump 226 provides an important function because it helps retain a hard wire in the region of notch 210, near the pivot axis 205 of the jaw 200, where the amount of force applied is greater than at a location further from pivot axis 205 (i.e., compression force applied by jaw members 200 is inversely proportional to the distance from the pivot axis 205). Bump 226 also prevents hard wires from slipping out of notch 210 during cutting, where the hard wires could damage an adjacent cutting area with sharper cutting edges used for cutting softer materials. Bump 226 is thus especially useful where notch 210 has been locally hardened by anodizing or some other suitable process.

As shown in FIG. 10, bottom surfaces 211 of notches 210 preferably pass each other completely when jaw members 200 are in a fully closed position such that wires of even the smallest diameter may be sufficiently contacted and cut by opposing bottom surfaces 211. Configuring the notches 210 to pass each other completely also aids in cutting where the cutting surfaces are separated by a gap or recess 214, as in the present invention.

Figure 11:
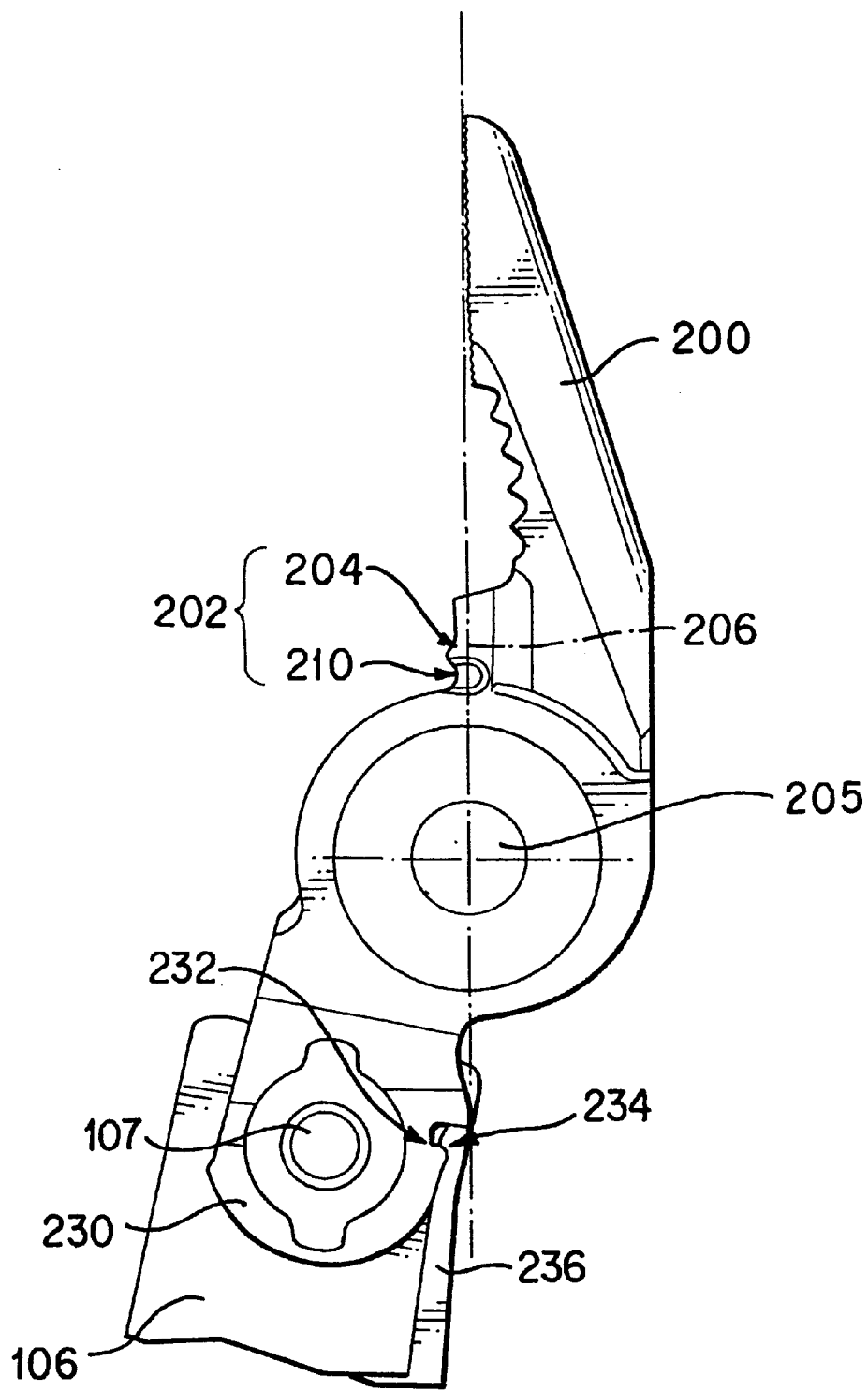
FIG. 11 is a side view of a jaw member and handle structure showing the operation of camming surfaces provided in accordance with the present invention.

Despite the benefits provided by recesses 212 on jaw members 200, some deformations caused by hard-wire cutting may be so large as to still rub against opposing inner surfaces 211 and partially bind or jam jaw members 200. Such binding may prevent opening of jaw members of a foldable multipurpose tool because of the pivotability of the handle members 106 with respect to the respective jaw members 102/200. As shown in FIG. 11, to ameliorate this problem, a tang portion 230 of jaw member 200 may be provided with a first camming surface 232 and handle member 106 may be provided with a second camming surface 234 shaped to engage first camming surface 232. First camming surface 232 may take the form of a recess or depression having two substantially opposed side walls 233 and second camming surface 234 may be provided in the form of a projection 235 on a leaf spring or other biasing structure 236 attached to handle member 106. When jaw member 200 is folded into or unfolded from the channel located on handle member 106, the jaw member 200 rotates with respect to the handle member 106 about pivot 107. To prevent unintentional pivoting and folding of handle member 106 with respect to jaw member 200 upon application of excessive force to handle members 106 in an effort to separate jammed jaws, projection 235 of second camming surface 234 on handle member 106 abuts and is frictionally secured with side walls 233 of first camming surface 232 to inhibit unintentional pivoting of handle member 106. The configuration of camming surfaces 232, 234 is selected so that a handle member will not pivot with respect to its associated jaw member unless a user so desires (e.g., during folding or unfolding of the tool). For instance, when a second camming surface 234 is provided on a biasing structure 236 associated with each handle member 106, the resilience of biasing structure 236 is selected to be high enough to prevent handle members 106 from unintentionally pivoting with respect to their associated jaw members 200 which are binding because of deformations to the cutting edges thereof, yet not so high as to unduly restrict folding of handle members 106 to place the tool in a compact configuration.

While the present invention has been described with reference to the preferred embodiments, those skilled in the art will recognize that numerous variations and modifications may be made without departing from the scope of the present invention. This is especially true with regard to the shape and configuration of the plier jaws, notch and recess disclosed. For example, the principle of the present invention may be applied to any type of jaw members with cutting edges used to cut objects harder than the jaw member material. Accordingly, it should be clearly understood that the embodiments of the invention described above are not intended as limitations on the scope of the invention, which is defined only by the following claims.

What is claimed is:

1. A hand-operated wire cutting tool comprising:
   a pair of jaw members interconnected and movable with respect to each other about a pivot axis, between an open position and a closed position;
   a wire cutter portion formed in each of said jaw members, each wire cutter portion having an inner surface and an outer surface, said inner surface defining a cutting plane and said outer surface intersecting said inner surface to form a cutting edge, said cutting edges passing closely alongside each other in said cutting plane as said jaw members move from said open to said closed position; and
   a recess formed on a portion of said inner surface of at least one of said wire cutter portions, said recess forming a gap between said inner surfaces of said wire cutter portions when said jaw members are in the closed position such that any deformation of said cutting edges is accommodated in said gap and said jaw members freely open and close despite such deformation.

2. The wire cutting tool of claim 1, wherein said gap between said inner surfaces of said wire cutter portions is greater than 0.1 mm.

3. The wire cutting tool of claim 2, wherein said gap between said inner surfaces of said wire cutter portions is approximately 0.2 mm.

4. The wire cutting tool of claim 1, further comprising a notch formed in each of said cutting edges, each said notch having a bottom surface angled less than 90° to said cutting plane.

5. The wire cutting tool of claim 4, wherein said recess is formed adjacent said notch.

6. The wire cutting tool of claim 5, wherein said recess is contiguous with said notch.

7. The wire cutting tool of claim 4, wherein said bottom surface of each notch is angled at about 83° to said cutting plane.

8. The wire cutting tool of claim 4, wherein said bottom surface of each notch is angled to said cutting plane at about 83° to about 89°.

9. The wire cutting tool of claim 4, wherein said notch is lunular.

10. The wire cutting tool of claim 1, further comprising a bump contiguous with each notch on each sharp edge, and projecting in a direction parallel to said cutting plane, wherein said bumps aid in guiding and retaining a wire between said notches.

11. The wire cutting tool of claim 1, wherein said notches are locally hardened.

12. The wire cutting tool of claim 1, further comprising a handle member attached to each of said jaw members, at least one handle member housing additional tool elements.

13. The wire cutting tool of claim 11, wherein said handle members fold compactly to store said jaw members when the jaw members are not in use.

14. The wire cutting tool of claim 13, further comprising a first camming surface on a tang portion of each of said jaw members and a second camming surface on each of said handle members wherein said first camming surface abuts said second camming surface when said jaw members are in use to prevent unintended pivoting of said handle members with respect to said jaw members.

15. The wire cutting tool of claim 14, further comprising a leaf spring attached to each of said handle members, wherein said second camming surfaces are formed on said leaf springs.

16. A multipurpose tool comprising:
   a pair of jaw members interconnected and movable with respect to each other about a pivot axis, between an open position and a closed position, each jaw member having a tang portion;
   a pair of handle members attached to each of said jaw members, said jaw members pivotally connected to said handle members to enable said handle members to fold compactly and to store said jaw members when said jaw members are not in use;
   a recess having two substantially opposed side walls on each of said tang portions; and
   a projection on each of said handle members;
   wherein said opposed side walls of said recess receive and frictionally secure said projection when said jaw members are in use to prevent unintended pivoting of said handle members with respect to said jaw members.

17. The multipurpose tool of claim 16, further comprising a leaf spring attached to each of said handle members, wherein said projections are formed on said leaf springs.

18. The multipurpose tool of claim 17, further comprising a plurality of additional tool elements housed within at least one of said handle members.

19. A multipurpose tool comprising:
   first and second jaw members interconnected and movable with respect to each other about a pivot axis, between an open position and a closed position, said first jaw member having a first tang portion and said second jaw member having a second tang portion;
   first and second handle members attached respectively to said first and second jaw members, said first handle member having a first handle longitudinal axis, and said second handle member having a second handle longitudinal axis, said first jaw member being pivotally connected to said first handle member and said second jaw member being pivotally connected to said second handle member to enable said handle members to fold compactly with respect to said jaw members to store said jaw members;
   a first recess on said first tang portion and a second recess on said second tang portion; and
   a first projection on said first handle member extending transverse to said first handle longitudinal axis and a second projection on said second handle member extending transverse to said second handle longitudinal axis;
   wherein said first recess receives and frictionally secures said first projection therein and said second recess receives and frictionally secures said second projection therein when said jaw members are in use to prevent unintended pivoting of said handle members with respect to said jaw members.

20. The multipurpose tool of claim 19, further comprising a first leaf spring attached to said first handle member and a second leaf spring attached to said second handle member, wherein said first projection is formed on said first leaf spring and said second projection is formed on said second leaf spring.

* * * * *